Inventor
GERALD RABOW
By Philip M. Bolton
Attorney

Dec. 6, 1966 G. RABOW 3,290,603

FREQUENCY CONTROL SYSTEM

Filed Sept. 8, 1958 2 Sheets-Sheet 2

Inventor
GERALD RABOW
By P. M. Bolton
Attorney

3,290,603
FREQUENCY CONTROL SYSTEM

Gerald Rabow, Brooklyn, N.Y., assignor to International Telephone and Telegraph Corporation, Nutley, N.J., a corporation of Maryland Filed Sept. 8, 1958, Ser. No. 760,285
13 Claims. (Cl. 325—421)

This invention relates to a frequency control system and more particularly to an automatic frequency search and control system for band centering upper and lower sideband operation in a superheterodyne receiver.

In conventional automatic frequency search and control systems, operation can be done on one selected sideband, not on both. Special circuitry is required to prevent operation on the unwanted sideband. The incoming RF radio frequency signal may be anywhere within a specified range of frequencies. This signal is applied to a mixer together with another radio frequency signal from a local oscillator. When the frequencies of the signal and the local oscillator differ by a predetermined amount, the intermediate frequency, then a signal which has this difference frequency exists at the output of the mixer and will be amplified in the intermediate frequency amplifier and subsequently detected. Due to drifths in the frequency of both the input radio frequency signal and the local oscillator, it is necessary to add automatic frequency control to the above system. This can be conventionally accomplished through the use of an intermediate frequency discriminator. The automatic frequency control could then be arranged, for example, to decrease the local oscillator frequency for positive discriminator output. This would lead to stable operation when the local oscillator frequency is above the input radio frequency signal frequency, so that the IF frequency of the signal is also decreased, but would lead to unstable operation on the other sideband when the local oscillator frequency is below the radio frequency signal so that the IF frequency of the signal is increased. If a curve of discriminator output vs local oscillator frequency were drawn it could be shown that the sense of the discriminator output is reversed for the two sidebands. Therefore, it is necessary to select one of two sidebands for the automatic frequency control operation and by some means suppress the other sideband. This requires additional circuitry which adds to the cost and complexity of the system.

It is, therefore, an object of this invention to provide an automatic frequency search and control system which can operate on either sideband of an upper or lower sideband system.

It is a further object of this invention to provide an automatic frequency search and control system which allows switching of the operation of this system from one sideband to another and thus increases the effective search range and hold-in range of the local oscillator and assures quick frequency acquisition.

A feature of this invention is an automatic frequency search and control system for a superheterodyne receiver capable of operating on either the upper or lower sidebands but not on both simultaneously which includes a mixer coupled to a source of input radio frequency signals, a local oscillator, an intermediate frequency amplifier and a detector. This system is adapted to tune the oscillator over a given frequency range and to halt this tuning when the oscillator frequency bears a predetermined relationship to the frequency of the input signal, that is, when the difference frequency between the local oscillator frequency and the frequency of the input signal is equal to the intermediate frequency. Means are provided to modulate the output of the oscillator with a reference signal and means are also provided coupled to the detector and responsive to the detection of an input signal which indicates that the predetermined relationship has been attained to halt the tuning of the oscillator. Means are also provided to detect from the output of the intermediate frequency amplifier the reference signal and responsive to the phase relationship between the detected reference signal and the reference signal to maintain the frequency of the oscillator at the predetermined relationship.

Another feature is that this system includes means to switch the operation of the system from a first sideband to the other sideband when the frequency of the oscillator attains a value which is insufficient to maintain the predetermined relationship with the input signal in the first sideband.

A further feature is that the means to detect the reference signal from the output of the intermediate frequency amplifier comprises a single tuned circuit and detector coupled thereto which detects the envelope of the reference signal.

The above-mentioned and other features and objects of this invention will become more apparent by reference to the following description of an embodiment taken in conjunction with the accompanying drawings, in which.

Figure 2:
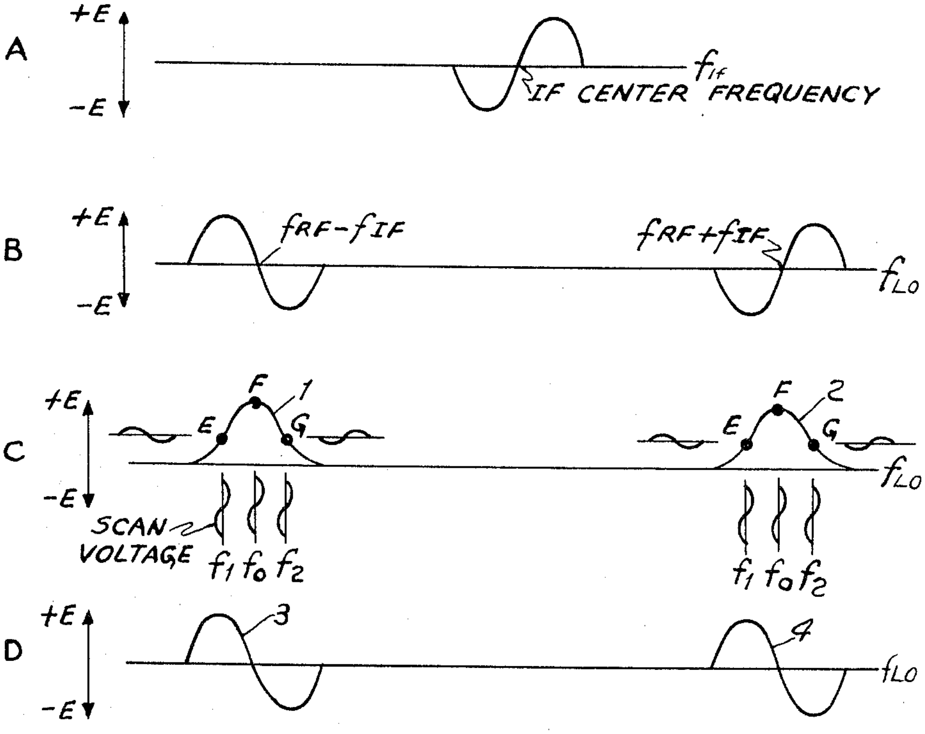
FIG. 2 is a set of curves used in explaining the principles of this invention.

With reference to FIG. 2, graph A shows the characteristic curve of an IF discriminator output vs. the IF frequency. Graph B illustrates the curve of the discriminator output vs. local oscillator frequency for a fixed signal frequency showing the upper and lower sidebands from which it can be seen that the sense of the discriminator output is reversed for the two sideband. $f_{RF}$ refers to the RF signal input to the mixer (to be described further on) and $f_{IF}$ refers to the IF center frequency. There is an output of the discriminator only when the frequency is within the IF bandwidth. The discriminator is tuned to the center frequency of the IF amplifier. If we replace the conventional discriminator by a single tuned circuit the characteristic curves of C at 1 and 2 result showing the single tuned circuit output vs. frequency for upper and lower sidebands, the sense of the two curves 1 and 2 being the same. If the curves 1 and 2 of C are differentiated then the curves 3 and 4 of D result, the sense of the curves 3 and 4 being the same for the two sidebands. It should be noted that the curves of D are similar to the curves of B except that the sense of the S curves 3 and 4 of D are the same, thus allowing automatic frequency control to be made stable for both sidebands simultaneously. Obviously, in the conventional discriminator output as illustrated in curves B the error voltage resulting from one curve will be opposite in sense to the error voltage resulting from the other curve so that only one error voltage can be used; the error voltage resulting from the other sideband must be suppressed in some manner.

Figure 1:
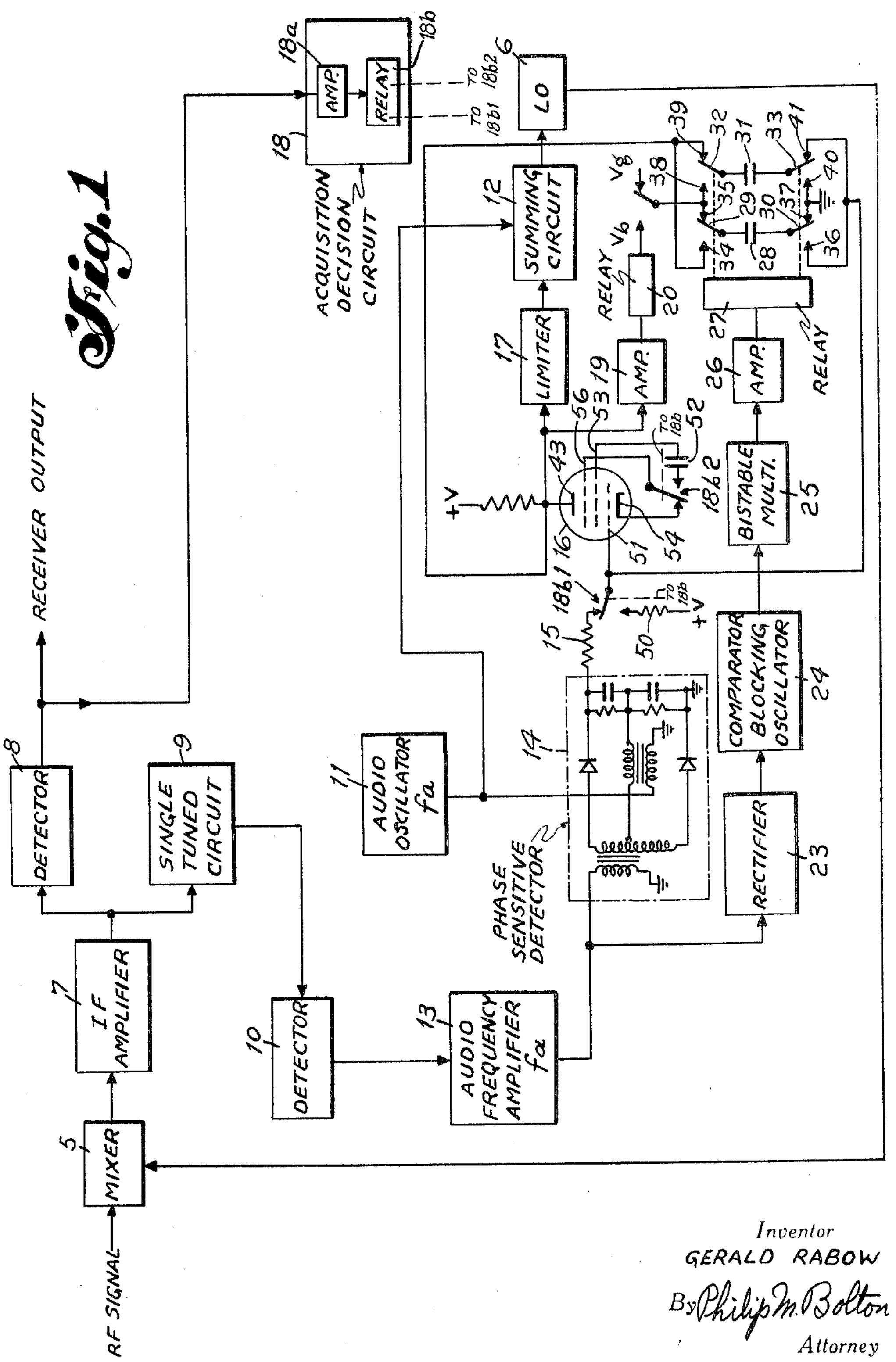
FIG. 1 is a block diagram and schematic of a receiver system.

A block diagram of the automatic frequency control system of this invention is shown in FIG. 1. The RF input signal is fed into a mixer 5 to which is coupled the output of a local oscillator 6. The output of the mixer 5 is coupled to the input of an IF amplifier 7. The output of the IF amplifier 7 is then fed into a detector 8, which may be of the square law type, from whence the detected RF signal is sent to the receiver output. The IF amplifier 7 output is also coupled to a single tuned circuit 9, the output of which is fed into a second detector 10. The single tuned circuit conventionally comprises an inductor and capacitor and is resonant at one frequency. Such a circuit is described on pages 40–41 of "Radio Engineering" by F. E. Terman, published by McGraw-Hill Company, Inc., 1947. The single tuned circuit is resonant at the center frequency of the IF. An audio oscillator 11 generates an audio frequency signal of frequency $f_a$ which is fed to a summing circuit 12, which in turn frequency modulates the output signal of the local oscillator 6. The frequency modulation is at the audio rate $f_a$ by an amount which is a small fraction of the IF bandwidth (for example by imposing the audio voltage on the repeller of the local oscillator klystron). In the single tuned circuit 9 the frequency modulation at audio rate $f_a$ is converted to an amplitude modulation of audio rate $f_a$ whose magnitude depends on the frequency error as described below. The detector 10, which may also be of the square law type, detects the output of the single tuned circuit 9. The output of the detector 10 is then passed through an audio frequency amplifier 13 in which the component of the signal varying at the audio rate $f_a$ is amplified and from thence passes to a phase sensitive detector 14. The output of the audio oscillator 11 is also fed into the phase sensitive detector 14, the latter giving a direct current error voltage output whose magnitude is indicative of the magnitude of the detected audio frequency signal and whose polarity is indicative of whether the two inputs to the phase detector are in phase or out of phase. The sense of the error voltage is the same for both the upper and lower sidebands. The output of the phase sensitive detector is fed through a resistor 15 into the grid of an amplifier tube 16. The output of the amplifier tube 16 is coupled to a limiter 17 which is used for limiting the local oscillator frequency excursion. The output of the limiter 17 is coupled to the input of the summing circuit 12 where it is combined with the audio frequency signal output of the oscillator 11 and the output of the summing circuit 12 including both the D.C. error voltage output of the phase sensitive detector and the modulating audio frequency signal $f_a$ is then coupled to the input of the local oscillator where, as stated above, the error voltage applied to the repeller of the klystron will correct the frequency of the local oscillator so that it will track the RF signal and the audio frequency voltage $f_a$ frequency modulates the local oscillator output.

The direct current error voltage of graph D thus is obtained by applying a small sinusoidal voltage superimposed on the direct current error voltage to the repeller of the klystron of the local oscillator. This alternating current voltage produces small deviation frequency modulation of the local oscillator signal. The single tuned circuit passband characteristic is utilized as a slope detector with the result that the frequency modulation of the local oscillator signal is changed to sinusoidal automatic frequency control error information, that is, the output of the detector 10. This sinusoidal error signal is then fed into the phase sensitive detector 14 from which the direct current correction voltage is obtained. The slope detection process can be explained with further reference to the curves of graph C and will be analyzed for three conditions: the IF frequency ($f_{sig}-f_{l.o.}$) at the band center, the IF frequency below band center and the IF frequency above band center. At band center ($f_0$) the frequency modulating of the local oscillator will produce no fundamental scan frequency component in the IF output, although some second harmonic will be present. At a frequency $f_1$, which is less than $f_0$, the scan voltage, that is, the output of the audio oscillator 11, $f_a$, will produce a scan frequency component in the single tuned circuit output in phase with the original scan voltage. The amplitude of this output will be proportional to the slope of the single tuned circuit response at the frequency in question. The operating point of the single tuned circuit is then at point E and an error voltage will appear at the output of the phase comparator when compared with the scan voltage of such polarity as to increase the local oscillator frequency. For a frequency $f_2$, which is greater than $f_0$ the scan frequency component of the tuned circuit output will be 180° out of phase with the original scan voltage. Again, the amplitude will be proportional to the slope of the tuned circuit response. In that case, the operating point of the tuned circuit is at G and the phase of the audio signal and the polarity of the error voltage are reversed so as to decrease the local oscillator frequency. If the operating point is at F then there will be no signal of the frequency of the scan voltage although even harmonics will be present and hence there will be a zero output from the phase comparator. The direct current correction voltage that is derived from the phase sensitive detector has a polarity which is determined by the relative phase relationship of the detected audio signal and the original scan voltage, and the amplitude of which is proportional to that of the automatic frequency control error voltage, which, in turn, is proportional to the slope of the tuned circuit response. It should be noted that in both sidebands if the operating point is at E then the polarity of the error voltage is the same and this holds true when the operating point is at G, whereas in typical discriminator outputs the polarities of both sidebands are reversed for the same operating point.

The output of the detector 8 is also fed into an acquisition decision circuit 18 (more fully described hereinafter). During the time that the frequency of the RF signal differs from the frequency of the local oscillator by an amount other than the intermediate frequency the acquisition decision circuit is in the search condition and relay **18*b* controls its contacts to cause tube 16 to function as a sawtooth generator and generate a sawtooth wave output, which, when coupled to the repeller of the klystron scans the local oscillator frequency through the frequency range of the local oscillator. At the time that the RF signal differs from the local oscillator frequency by the amount of the intermediate frequency, there will be an output at the mixer 5 of correct frequency to pass through the IF amplifier, thence through the detector 8 and to acquision circuit 18, which consists of an amplifier 18*a* and a relay 18*b*, so as to actuate the relay 18*b* which causes pole 18*b*1 to disconnect resistor 50 and connect resistor 15 to grid 51 of tube 16, and causes pole 18*b*2 to disconnect capacitor 52 (which is in turn connected to screen 53) and connect cathode 54 to suppressor 56. Tube 16 no longer functions as a sawtooth generator, but only as an amplifier with the charge on condenser 28 or 31 being maintained at the same level as at the time of acquisition. Tracking then occurs and the charge on these condensers is varied by the output of phase sensitive detector 14 as amplified by tube 16**. Thus, the search function of the acquisition decision circuit terminates and the sawtooth wave is changed to a steady D.C. voltage which is controlling for the frequency of the local oscillator at the point where the search ceased. The automatic frequency control of this invention as described, then assumes the task of tracking any drift in the RF signal to keep the RF signal within the hold-in range of the local oscillator.

Figure 3:
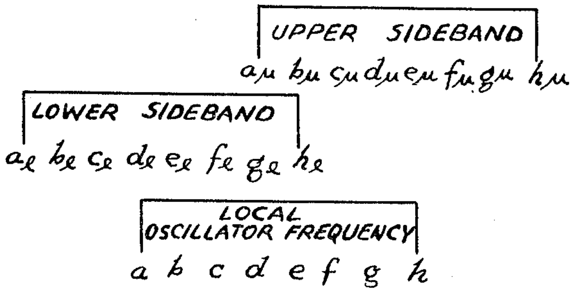
FIG. 3 is another set of curves used in showing the relationship of the upper and lower sidebands to the frequency range of the local oscillator.

The sideband switching function of this invention comprises the additional circuitry shown in FIG. 1. The output of the tube 16 is also fed to an amplifier 19 and the output of the amplifier 19 controls the action of a relay 20 which is of the single pole double throw type one of the positions thereof, 21, being the terminus for the voltage supply $V_b$ and other position 22, being the terminus for a votlage supply $V_g$. The output of the audio frequency amplifier 13 is also fed to a rectifier 23 and the output of the rectifier 23 is coupled to a comparator blocking oscillator 24. The output of the comparator blocking oscillator 24 is coupled to a bistable multivibrator 25, which, when passed through an amplifier 26 controls the relay 27 which has four sections, each section having a single pole double throw arrangement. A capacitor 28 couples the pole 29 to the pole 30. A capacitor 31 couples the pole 32 to the pole 33. Pole 29 alternately switches from position 34 to 35, pole 30 likewise serves positions 36 and 37, pole 32 switches from position 38 to 39 and pole 33 likewise serves positions 40 and 41. Position 35 is connected to position 38 and are connected in common to pole 42 of relay 20. The resistor 15 is also coupled to positions 36 and 41 in the relay 27. Positions 37 and 40 are both coupled to ground and positions 32 and 34 are coupled to the plate 43 of the tube 16. Positions 36 and 41 go to grid 51. When the RF signal frequency drifts to the point "$a_u$" or "$h_l$" as shown in FIG. 3 where operation of the system should be shifted to the other sideband, the local oscillator can no longer follow the automatic frequency control signal and a comparatively large automatic frequency control error results. This will cause the comparator blocking oscillator 24 to fire, change the state of the bistable multivibrator 25 and also change the position of the relay 27 and thus, interchange the capacitors 28 and 31. The voltage on the capacitor to be switched in must be one of two values. If the local oscillator was originally at "*h*" the voltage on the capacitor to be switched in should correspond to $V_b$. If the local oscillator was originally at "*a*" the capacitor voltage to be switched in should correspond to $V_g$. Control of the voltage of the capacitor to go in is controlled by the relay 20. When the repeller voltage corresponds to less than the voltage corresponding to the frequency "*d*" of the local oscillator frequency range the capacitor voltage is $V_g$, if the repeller voltage corresponds to a voltage greater than the voltage corresponding to the frequency "*e*" of the local oscillator frequency range then the capacitor voltage is $V_b$. If the local oscillator is at the frequency "*h*" and the RF signal is at "$h_l$" and the RF is drifting off "$h_l$" to the right then the local oscillator would lose control since the difference frequency would now be less than the IF frequency. We would then want to switch the local oscillator to the operating point "*b*" so that the operation of the system is automatically switched from "$h_l$" of the lower sideband to $b_u$ of the upper sideband. Conversely, if the local oscillator is at the frequency "*a*" with the operation of the system on the upper sideband and the RF signal starts to drift towards the left from "$a_u$" then the local oscillator would lose control, the automatic frequency control error voltage will become correspondingly large and relay 27 will switch the capacitors so that the local oscillator frequency is almost instantly switched "*g*" and the sideband operation switches automatically from "$a_u$" to "$g_l$."

It is apparent that the use of sideband switching will increase the effective search range and hold-in range of the local oscillator. To properly utilize the properties of sideband switching the intermediate frequency for example, 60 mc., should be made slightly less than half the local oscillator tuning range for example, 120 mc. The effective search range of the conventional system is equal to the frequency range of the local oscillator i.e., 120 mc. In the system of this invention, the effective search range as well as the hold-in range is equal to twice the intermediate frequency plus the frequency range of the local oscillator i.e., 240 mc. Sideband switching also assures frequency use at very short ranges. A radio frequency signal has some side lobe energy outside its frequency spectrum energy lobe. At short ranges, this energy may cause the receiver to lock onto that part of the spectrum outside its desired frequency spectrum. At longer ranges, this outside energy is too small to be effective for that purpose. If the radio frequency signal is so large that frequency search stops at one of the side lobes of the frequency spectrum, the automatic frequency control system will be able to pull into the main lobe even if it is necessary to switch to the other sideband to do so while in conventional systems now in use frequency search would have to be started all over again because the oscillator does not have the desired range.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic frequency search and control system for a superheterodyne receiver capable of operation on either the upper sideband or lower sideband which includes a mixer coupled to a source of input signals, an oscillator and an intermediate frequency amplifier coupled to said mixer and a detector coupled to said intermediate frequency amplifier, said system being adapted to tune said oscillator over a given frequency range and to halt said tuning when the oscillator frequency bears a predetermined relationship to the frequency of said input signal, means to frequency modulate the output of said oscillator with a reference signal, means coupled to said detector and responsive to detection of an input signal from said source, which is indicative that said predetermined relationship has been attained, to halt the tuning of said oscillator, and means to detect from the output of said intermediate frequency amplifier said reference signal and responsive to an error signal indicative of the phase relationship between said detected reference signal and said reference signal to maintain the frequency of said oscillator at said predetermined relationship.

2. An automatic frequency search and control system for a superheterodyne receiver capable of operation on either the upper sideband or lower sideband which includes a mixer coupled to a source of input signals, a first oscillator and an intermediate frequency amplifier coupled to said mixer and a detector coupled to said intermediate frequency amplifier, said system being adapted to tune said first oscillator over a given frequency range and to halt said tuning when the first oscillator frequency bears a predetermined relationship to the frequency of said input signal, means coupled to said detector and responsive to detection of an input signal from said source, which is indicative that said predetermined relationship has been attained, to halt the tuning of said oscillator, a second oscillator, means to frequency modulate the output of said first oscillator with the output signal of said second oscillator, and means to detect from the output of said intermediate frequency amplifier said second oscillator output signal and responsive to an error signal indicative of the phase relationship between said detected second oscillator output signal and said second oscillator output signal to maintain the frequency of said first oscillator at said predetermined relationship.

3. An automatic frequency search and control system for a superheterodyne receiver capable of operation on either the upper sideband or lower sideband which includes a mixer coupled to a source of input signals, a first oscillator and an intermediate frequency amplifier coupled to said mixer and a first detector coupled to said intermediate frequency amplifier, said system being adapted to tune said first oscillator over a given frequency range and to halt said tuning when the first oscillator frequency bears a predeterminted relationship to the frequency of said input signal, a second oscillator, means to frequency modulate the output of said first oscillator with the output signal of said second oscillator, a second detector, a signal tuned circuit coupling the output of said intermediate frequency amplifier to said second detector to obtain as the output of said second detector the detected second oscillator signal, means coupled to said first detector and responsive to detection of an input signal from said source, which is indicative that said predetermined relationship has been attained, to halt the tuning of said first oscillator, and means responsive to an error signal indicative of the phase relationship between said detected second oscillator signal and said second ocillator signal to maintain the frequency of said first oscillator at said predetermined relationship.

4. An automatic frequency search and control system for a superheterodyne receiver capable of operation on either the upper sideband or lower sideband which includes a mixer coupled to a source of input signals, a first oscillator and an intermediate frequency amplifier coupled to said mixer and a first detector coupled to said intermediate frequency amplifier, said system being adapted to tune said first oscillator over a given frequency range and to halt said tuning when the first oscillator frequency bears a predetermined relationship to the frequency of said input signal, comprising means coupled to said first detector and responsive to detection of an input signal from said source, which is indicative that said predetermined relationship has been attained, to halt the tuning of said first oscillator, a second oscillator generating an audio frequency signal, means to frequency modulate the output of said first oscillator with said audio frequency signal, a second detector, a single tuned circuit coupling the output of said intermediate frequency amplifier to said second detector to detect from said intermediate frequency amplifier output said audio frequency signal, a phase sensitive detector, an audio amplifier coupling said detected audio frequency signal to said phase sensitive detector, means coupling the output of said second oscillator to said phase sensitive detector to obtain an error voltage output thereof indicative of the magnitude of the detected audio signal and the sense of the phase relation between said detected audio frequency signal and the output of said second oscillator and means coupling said error voltage to said first oscillator to maintain the frequency of said first oscillator at said predetermined relationship.

5. An automatic frequency search and control system for a superheterodyne receiver capable of operation on either the upper sideband or lower sideband which includes a mixer coupled to a source of input signals, an oscillator and an intermediate frequency amplifier coupled to said mixer and a detector coupled to said intermediate frequency amplifier, said system being adapted to tune said oscillator over a given frequency range and to halt said tuning when the oscillator frequency bears a predetermined relationship to the frequency of said input signal, means to frequency modulate the output of said oscillator with a reference signal, means coupled to said detector and responsive to detection of an input signal from said source, which is indicative that said predetermined relationship has been attained, to halt the tuning of said oscillator, and means to detect from the output of said intermediate frequency amplifier said reference signal and responsive to an error signal indicative of the phase relationship between said detected reference signal and said reference signal to maintain the frequency of said oscillator at said predetermined relationship, and means responsive to said detected reference signal when the frequency of said first oscillator is insufficient to maintain said predetermined relationship with said input signal in one sideband and said error signal can no longer control the frequency of said first oscillator to switch the operation of said system to said other sideband by changing the operating point of said first oscillator.

6. An automatic frequency search and control system for a superheterodyne receiver capable of operation on either the upper sideband or lower sideband which includes a mixer coupled to a source of input signals, a first oscillator and an intermediate frequency amplifier coupled to said mixer and a detector coupled to said intermediate frequency amplifier, said system being adapted to tune said first oscillator over a given frequency range and to halt said tuning when the first oscillator frequency bears a predetermined relationship to the frequency of said input signal, a second oscillator generating an audio frequency signal, means to frequency modulate the output of said first oscillator with said audio frequency signal, means coupled to said detector and responsive to detection of an input signal from said source, which is indicative that said predetermined relationship has been attained, to halt the tuning of said first oscillator, and means to detect from the output of said intermediate frequency amplifier said audio frequency signal and responsive to an error signal indicative of the phase relationship between said detected audio frequency signal and said audio frequency signal output of said second oscillator to maintain the frequency of said first oscillator at said predetermined relationship, and means responsive to said detected audio frequency signal when the frequency of said first oscillator is insufficient to maintain said predetermined relationship with said input signal in one sideband and said error signal can no longer control the frequency of said first oscillator to switch the operation of said system to said other sideband by changing the operating point of said first oscillator.

7. An automatic frequency search and control system for a superheterodyne receiver capable of operation on either the upper sideband or lower sideband which includes a mixer coupled to a source of input signals, a first oscillator and an intermediate frequency amplifier coupled to said mixer and a first detector coupled to said intermediate frequency amplifier, said system being adapted to tune said first oscillator over a given frequency range and to halt said tuning when the first oscillator frequency bears a predetermined relationship to the frequency of said input signal, means coupled to said first detector and responsive to detection of an input signal from said source, which is indicative that said predetermined relationship has been attained, to halt the tuning of said first oscillator, a second oscillator generating an audio frequency signal, means to frequency modulate the output of said first oscillator with said audio frequency signal, a second detector, a single tuned circuit coupling the output of said intermediate frequency amplifier to said second detector to detect said audio frequency signal, and means responsive to an error signal indicative of the phase relationship between said detected audio frequency signal and said second oscillator audio frequency signal to maintain the frequency of said first oscillator at said predetermined relationship, and means responsive to said detected audio frequency signal when the frequency of said first oscillator is insufficient to maintain said predetermined relationship with said input signal in one sideband and said error signal can no longer control the frequency of said first oscillator to switch the operation of said system to said other sideband by changing the operating point of said first oscillation.

8. An automatic frequency search and control system for a superheterodyne receiver capable of operation on either the upper sideband or lower sideband which includes a mixer coupled to a source of input signals, a first oscillator and an intermediate frequency amplifier coupled to said mixer and a first detector coupled to said intermediate frequency amplifier, said system being adapted to tune said first oscillator over a given frequency range and to halt said tuning when the first oscillator frequency bears a predetermined relationship to the frequency of said input signal, means coupled to said first detector and responsive to detection of an input signal from said source, which is indicative that said predetermined relationship has been attained, to halt the tuning of said first oscillator, a second oscillator generating an audio frequency signal, means to frequency modulate the output of said first oscilaltor with said audio frequency signal, a second detector, a signal tuned circuit coupling the output of said intermediate frequency amplifier to said second detector to detect from said intermediate frequency amplifier output said audio frequency signal, a phase sensitive detector, an audio amplifier coupling said detected audio frequency signal to said phase sensitive detector, means coupling the output of said second oscillator to said phase sensitive detector to obtain an error voltage output thereof indicative of the magnitude of the detected audio signal and the sense of the phase relation between said detected audio frequency signal and the output of said second oscilaltor, means coupling said error voltage to said first oscillator to maintain the frequency of said first oscillator at said predetermined relationship, and means responsive to said detected audio frequency signal when the frequency of said first oscillator in insufficient to maintain said predetermined relationship with said input signal in one sdeband and said error signal can no longer control the frequency of said first oscillator to switch the operation of said system to said other sideband by changing the operating point of said first oscillator.

9. An automatic frequency search and control system according to claim 8 wherein said coupling means for said error voltage include an amplifier tube a resistor coupling the output of said phase sensitive detector to the input of said amplifier tube, a summing circuit, a limiter coupling the output of said amplifier tube to said summing circuit, means coupling the output of said second oscillator to said summing circuit and means coupling the combined output of said summing circuit to said first oscillator.

10. An automatic frequency search and control system according to claim 9 wherein said switching means include first and second predetermined operating points for said first oscillator within the frequency range of said first oscillator and further includes means to switch the operation of said first oscillator from one of said predetermined points to the other when operation on said other sideband is necessary for maintaining said predetermined relationship.

11. An automatic frequency search and control system according to claim 10 wherein the frequency of said first and second predetermined operating points is determined by first and second capacitors alternately coupling the input of said amplifier tube to the output thereof and first and second voltages impressed respectively upon said first and second capacitors, said first and second voltage correponding to the voltages on the repeller of the klystron of said first oscillator that causes said first oscillator to generate the frequencies of said first and second predetermined operating points.

12. An automatic frequency search and control system according to claim 11 wherein said switching means include a first relay responsive to the rectified voltage output of said audio amplifier to change said coupilng between said input and output of said amplifier tube from said first capacitor to said second capacitor when said rectified voltage attains a sufficient amplitude due to the inability of said first oscilaltor to maintain said predetermined relationship in one of said sidebands on which said system is operating, and thus cause said first oscillator to function immediately at said second predetermined operating point so that said system will maintain said predetermined relationship during operation in said other sideband.

13. An automatic frequency search and control system according to claim 12 wherein said switching means further include a second relay alternately coupling said first and second voltages respectively to said first and second capacitors and responsive to a sufficient amplitude of said error voltage when said first oscillator is unable to maintain said predetermined relationship in said one of said sidebands, to switch said first voltage to said first capacitor coincident with said first relay switching from said first capacitor to said second capacitor and thereby change said first capacitor with said first voltage.

References Cited by the Examiner

UNITED STATES PATENTS

| | | | |
|---|---|---|---|
| 1,948,671 | 2/1934 | Potter | 250—20.36 |
| 1,952,463 | 3/1934 | Runge | 250—20.36 |
| 2,595,608 | 5/1952 | Robinson et al. | 250—20.36 |
| 2,647,994 | 8/1953 | Weiss | 250—20.36 |
| 2,852,669 | 9/1958 | Ashby | 250—20.36 |
| 2,933,598 | 4/1960 | Heller | 250—20.36 |
| 2,946,884 | 7/1960 | Mraz | 250—20.36 |
| 2,976,410 | 3/1961 | Schock | 250—20.36 |
| 2,976,411 | 3/1961 | Kahn | 250—20.36 |

KATHLEEN H. CLAFFY, *Primary Examiner.*

FREDERICK M. STRADER, CHESTER L. JUSTUS, *Examiners.*

G. M. FISHER, R. LINN, *Assistant Examiner.*